United States Patent
Baldini Soares et al.

(10) Patent No.: US 10,733,591 B2
(45) Date of Patent: Aug. 4, 2020

(54) TIERED MODEL FOR EVENT-BASED SERVERLESS COMPUTING

(71) Applicant: INTERNATIONAL BUSINESS MACHINES CORPORATION, Armonk, NY (US)

(72) Inventors: Ioana M. Baldini Soares, Irvington, NY (US); Stephen J. Fink, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 349 days.

(21) Appl. No.: 15/291,051

(22) Filed: Oct. 11, 2016

(65) Prior Publication Data

US 2018/0101403 A1    Apr. 12, 2018

(51) Int. Cl.
| | |
|---|---|
| *G06F 9/50* | (2006.01) |
| *G06Q 20/22* | (2012.01) |
| *G06Q 20/08* | (2012.01) |
| *H04L 12/911* | (2013.01) |
| *H04L 12/917* | (2013.01) |

(52) U.S. Cl.
CPC ........... *G06Q 20/22* (2013.01); *G06F 9/5027* (2013.01); *G06Q 20/0855* (2013.01); *G06F 9/5005* (2013.01); *H04L 47/76* (2013.01); *H04L 47/78* (2013.01)

(58) Field of Classification Search
CPC ...... G06F 9/45558; G06F 9/46; G06F 9/5077; H04L 47/56; H04L 63/101
See application file for complete search history.

(56) References Cited

U.S. PATENT DOCUMENTS

| 8,244,874 B1 * | 8/2012 | Thireault ............. G06F 9/5055 |
| | | 709/226 |
| 9,451,013 B1 * | 9/2016 | Roth ................... H04L 67/1097 |
| 2003/0130882 A1 | 7/2003 | Shuttleworth et al. |

(Continued)

FOREIGN PATENT DOCUMENTS

| JP | 6291134 | * | 3/2018 | ............... G06F 9/46 |
| WO | 2005098674 A1 | | 10/2005 | |

(Continued)

OTHER PUBLICATIONS

Mtita et al., "Serverless Lightweight Mutual Authentication Protocol for Small Mobile Computing Devices," Seventh IFIP International Conference on New Technologies, Mobility and Security (NTMS), Paris, France, Jul. 2015.

*Primary Examiner* — Lewis A Bullock, Jr.
*Assistant Examiner* — Gilles R Kepnang
(74) *Attorney, Agent, or Firm* — Intelletek Law Group, PLLC; Gabriel Daniel, Esq.

(57) ABSTRACT

A computer system, method, and computer readable product are provided for event-based serverless computing with tiered latency. In various embodiments, computer-executable instructions are received along with an indication of an event whose occurrence triggers execution of those instructions within a container on a serverless computing platform. Additionally, the instructions come with an indication of an acceptable amount of latency between the event occurring and the instructions being executed. Multiple different actions may be made to execute the instructions based on that indicated latency.

20 Claims, 8 Drawing Sheets

(56) References Cited

U.S. PATENT DOCUMENTS

| | | |
|---|---|---|
| 2005/0038836 A1 | 2/2005 | Wang |
| 2010/0262924 A1 | 10/2010 | Kalu |
| 2011/0213829 A1* | 9/2011 | Concini .................. G06F 9/547 |
| | | 709/203 |
| 2012/0072762 A1* | 3/2012 | Atchison ............... G06F 9/5072 |
| | | 714/2 |
| 2014/0082199 A1 | 3/2014 | Johnson |
| 2014/0282890 A1* | 9/2014 | Li ......................... H04L 63/101 |
| | | 726/4 |
| 2015/0256481 A1* | 9/2015 | Turovsky ................ H04L 47/76 |
| | | 709/226 |
| 2016/0092250 A1* | 3/2016 | Wagner ............... G06F 9/45558 |
| | | 718/1 |
| 2016/0162336 A1* | 6/2016 | Zheng ..................... H04L 47/56 |
| | | 718/104 |
| 2017/0083368 A1* | 3/2017 | Bishop .................... G06F 9/505 |
| 2017/0201597 A1* | 7/2017 | Narasimhan .......... H04L 67/327 |
| 2017/0264659 A1* | 9/2017 | Raju ........................ H04L 63/10 |
| 2017/0371703 A1* | 12/2017 | Wagner .................. G06F 9/485 |
| 2018/0039524 A1* | 2/2018 | Dettori .................. G06F 9/5077 |
| 2018/0113734 A1* | 4/2018 | Yamato ..................... G06F 9/46 |

FOREIGN PATENT DOCUMENTS

| | | |
|---|---|---|
| WO | 2009082296 A1 | 7/2009 |
| WO | 2014108510 A1 | 7/2014 |

\* cited by examiner

TIERED MODEL FOR EVENT-BASED SERVERLESS COMPUTING

BACKGROUND

The present application relates to serverless computing platforms. In a serverless computing platform, a user provides computer-readable instructions to be executed to the platform, and the platform manages selecting and provisioning a virtual machine or container on which to execute the code. Then, where the user is to be charged, the user is generally charged for the computing resources used to execute the instructions, and not for executing the virtual machine in which the instructions are executed, for example.

A container may generally differ from a virtual machine in that a container omits a guest operating system (or, rather, each container on a physical server shares one guest operating system that is external to those containers), whereas a virtual machine generally includes a guest operating system. This different architecture may enable a container to be started more quickly and operate using less computing resources, like RAM (random access memory), than a corresponding virtual machine. A container generally comprises a file system and other functions to execute code—a runtime environment, system tools, and system libraries. Then, a user's computer-executable instructions may be executed within a container using these aspects of that container.

Serverless computing may be thought of as a misnomer. The term does not indicate that no computer servers are used in the platform. Rather, the term indicates that a user of the serverless computing platform does not need to provision or manage the physical computer servers, virtual machines, containers, and the like, that are used by the platform in executing the user's instructions.

SUMMARY

In various embodiments, a computing device that implements an embodiment of the present disclosure receive computer-executable instructions from a user of the device. The computing device also receives an indication of an event that, when this event occurs (sometimes referred to as an event firing), the computer-executable instructions are to be executed. The computing device also receives an indication of an acceptable latency between a time at which the event occurs and a time at which computer-executable instructions are to be executed in response to the event occurring.

The computing device then performs different operations based on the indicated acceptable latency. Where the acceptable latency is below a first threshold amount of time, the computing device launches a container in which to execute the computer-executable instructions before the event occurs. Instead, where the acceptable latency is above the first threshold amount of time and below a second threshold amount of time, the computing device schedules a launch of the container for a future time. Where the acceptable latency is above the second threshold amount of time, the computing device tries to schedule an idle container, if available, in which to execute the computer-executable instructions. If no idle container is available, the computing device schedules launch of a container for a future time.

Then, when the computing device receives an indication that the event has occurred, the computing device executes the computer-executable instructions in accordance with the acceptable latency.

DETAILED DESCRIPTION

Figure 1:
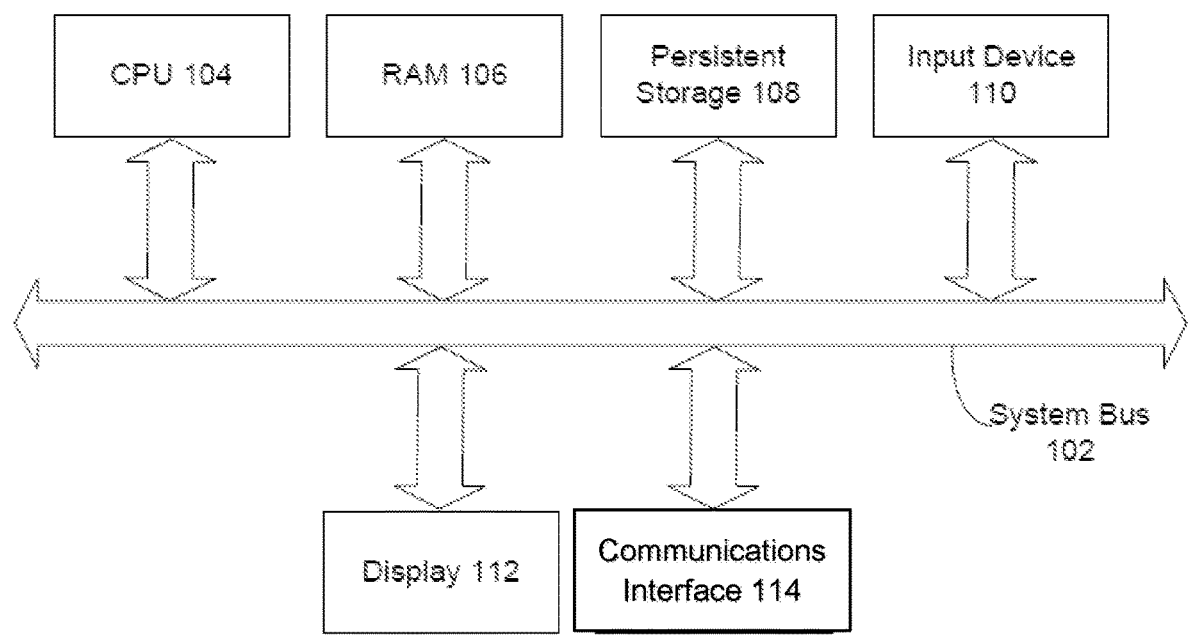
FIG. 1 illustrates examples of hardware used according to embodiments of the present disclosure.

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

A serverless computing platform as described herein offers the ability to register snippets of computer-executable instructions to be executed as triggered in response to external events occurring. These snippets—as may be used herein to describe a set of computer-executable instructions—may be stateless and ephemeral. That is, it may be that these snippets execute only once. A benefit of such a platform may be that a developer of a snippet is freed from the burden of dealing with provisioning and maintaining servers or virtual machines (VMs). Instead, the developer may focus on the main logic of his or her snippets. The burden of orchestrating running servers and coordinating external events that trigger the snippets may then be a responsibility of the serverless platform.

One aspect of such a serverless scenario is the latency between the external event occurring and the start of the execution of the snippet associated with the event. Different types of instruction snippets involve different levels of responsiveness. For example, an application that an end-user interacts with may call for a low-level of latency (such as tens of milliseconds), whereas a batch-processing application may be acceptable with a higher level of latency (such as hours). In such a scenario, a serverless computing platform may implement priority scheduling for running snippets that takes into account an acceptable latency associated with each snippet, the rate at which events are occurring that trigger snippets being executed, and the computing load on the serverless computing platform, among other things.

Another example of a service and its corresponding acceptable latency is a service that creates photos uploaded by a user to his or her account and creates thumbnails of those photos. The acceptable latency for this service may be on the order of minutes. But a financial trading service that has computations performed on a serverless platform may have a much shorter acceptable latency—on the order of milliseconds. Then there may be services that have an acceptable latency on the order of a day or a week, such as scanning a container image for vulnerabilities.

In a serverless computing platform, a user may be charged based on the amount of time and computing resources that are consumed by running the user's snippets. This may be viewed in contrast from other models, where a user may be charged for as long as his or her servers are up and running, regardless of whether those servers are processing requests or sitting idle. In a serverless computing scenario, a user's charge for having his or her snippets executed may vary based on the associated acceptable latency. For example, executing a given snippet may carry a larger charge if it has a lower acceptable latency than if it has a higher acceptable latency.

The embodiments described herein primarily consider a three-tiered latency system, with the acceptable latency to execute a given set of instructions being Low, Medium, or High. It may be appreciated that use fewer or greater numbers of types of acceptable latency (for example, embodiments where acceptable latency is specified with a particular time value).

A number of different types of services may be developed on a serverless platform with tiered latency. These include mobile device or Internet of Things services, where the service backend is implemented on a serverless platform. A serverless platform may be used to coordinate work items in a pipeline for big data, cognitive, or analytics services. A serverless platform may be used to automate a development operations (DevOps) pipeline based on events that occur for successful builds of a program, completed staging, or a go-live event.

As shown in FIG. 1, a block diagram illustrates examples of computer hardware that may be used according to embodiments of the present disclosure for event-based serverless computing with tiered latency. CPU (central processing unit) 104, RAM (random access memory) 106, persistent storage 108, input device 110, display 112, and communications interface 114 are connected to a system bus 102.

In FIG. 1, persistent storage 108, in an embodiment of the present disclosure, has capabilities that include storing a program that can execute the processes described herein. Persistent storage 108, in an embodiment of the present disclosure, can store an executing application manages a serverless computing platform and executes computer-executable instructions in response to events and with tiered latency.

Additionally, in FIG. 1, an input device 110, such as a keyboard and a mouse may be used to provide input to the computer hardware of FIG. 1. For example, this input may be made to manage the operation of a serverless computing platform and executes computer-executable instructions in response to events and with tiered latency.

In one embodiment, the communications interface 114 of FIG. 1 is connected to a communications network using a WiFi (wireless-fidelity) or LTE (long-term evolution) network communications protocol. Communications interface 114 may also comprise a network interface card (NIC) that is connected to a communications network via an Ethernet cable. In the present disclosure, communications interface 114 may receive computing-executable instructions from a user at a remote computer, along with an indication of an event that, when occurring, the instructions are to be executed, and an indication of an acceptable latency between when the event occurs and when the computer-executable instructions are to be executed.

In the present disclosure, communications interface 114 receives processing requests in accordance with a communication protocol, for example TCP/IP (Transmission Control Protocol/Internet Protocol), from another computer (not shown), and processing results are sent to a third computer (not shown). As depicted, communications interface 114 may comprise hardware for transmitting and receiving network data, and/or processor-executable instructions for doing the same.

Figure 2:
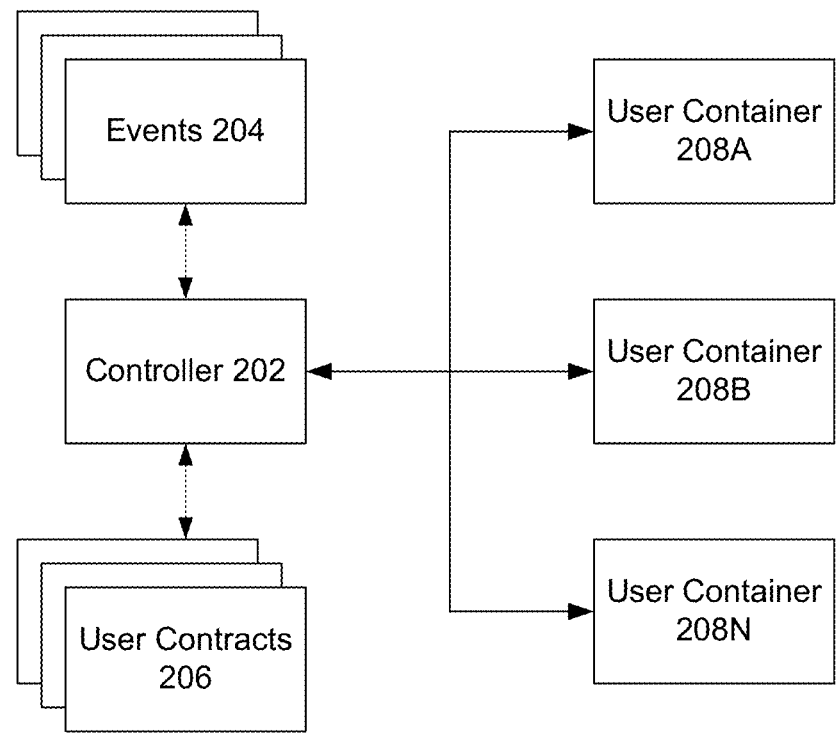
FIG. 2 illustrates examples of a system architecture according to embodiments of the present disclosure.

FIG. 2 illustrates examples of a system architecture according to embodiments of the present disclosure. In some embodiments, FIG. 2 may be implemented using the computer hardware of FIG. 1. For example, controller 202 may be implemented on one or more instances of the computer hardware of FIG. 1, and user containers 208A-208N may also be implemented on one or more instances of the computer hardware of FIG. 1. In some embodiments, the system architecture of FIG. 2 may be used to implement the operating procedures of FIGS. 5-8.

As depicted, controller 202 receives information about events 204 and user contracts 206, and uses this information to manage executing computer-executable instructions on user containers 208A, 208B, and 208N. User contracts 206 may comprise tuples of (1) computer-executable instructions; (2) an indication of an event that, upon occurrence, the computer-executable instructions are to be executed; and (3) an acceptable latency between when the event occurs and the computer-executable instructions are to be executed.

In response to receiving an indication that a particular event has occurred among events 204, controller 202 may then determine a corresponding (code-snippet, acceptable-latency) tuple, and execute the computer-executable instructions according to the associated acceptable latency. Take, for example, a three-tiered latency system, where acceptable latency may be Low, Medium, or High. If the acceptable latency is Low, controller 202 may have already proactively launched a container that contains the computer-executable instructions, and may immediately execute the instructions within the container. If instead the acceptable latency is Medium, controller 202 may have already scheduled the launch of a container in which to execute the computer-executable instructions. Where that scheduled launch has already occurred, the instructions may be immediately executed. And where that scheduled launch has yet to occur, the instructions may be executed upon launch of that container.

Then, if the acceptable latency is High, controller 202 may have scheduled a container (or one of a particular type of container) to be used to execute the instructions when it becomes idle. Then, when such a container is idle, the instructions may be executed within it. While a three-tiered latency model is described here, it may be appreciated that there are embodiments that use a smaller or larger number of latency tiers.

Controller 202 may launch new containers in which to execute computer-executable instructions in response to events occurring. Controller 202 may vary the number of containers it launches based on a variety of factors, such as the number of users that have registered for low latency execution, the current load of user code running on the serverless computing platform, the rate at which events that trigger instruction execution are occurring, and projections for the duration of running instructions and expected event rate.

Containers 208A-N may be specialized for a particular kind of instruction snippets. As such, in some embodiments, controller 202 may launch a new container for each instruction snippet to be executed. Or, where two snippets are sufficiently similar (e.g., they use the same operating system configured in a similar manner and are written in the same programming language), a container may be reused between the two snippets. There may be times when events that trigger various snippets to be executed do not occur for a period of time, and the corresponding containers are sitting idle, without any load. In such situations, controller 202 may periodically recycle these idle containers (either by using them to execute different instruction snippets, or by terminating their execution) and launching different containers.

Figure 3:
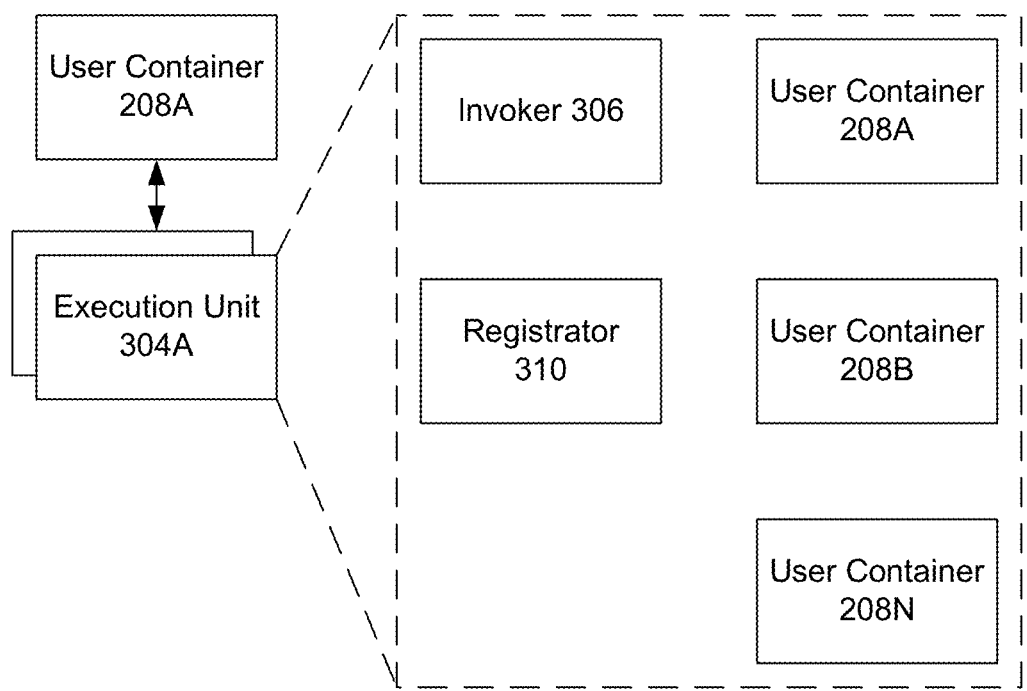
FIG. 3 illustrates more examples of a system architecture according to embodiments of the present disclosure.

FIG. 3 illustrates more examples of a system architecture according to embodiments of the present disclosure. As depicted, FIG. 3 illustrates a detailed view of the relationship between controller 202 and user containers 202A-202N of FIG. 2. Specifically, some of the functions described as being performed by controller 202 of FIG. 2 as it manages containers 202A-202N may here be performed by execution unit 304A, execution unit 304B, invoker 306, or registrar 306.

Controller 302 may perform the functions of controller 202 described with respect to FIG. 2 that are not otherwise described herein as being performed by execution unit 304A, execution unit 304B, invoker 306, or registrar 306. When computer-executable instructions are received, controller 302 may perform an entitlement checking operation to ensure that the user providing the computer-executable instructions has proper rights to have his or her request executed. Should this rights check pass, controller 302 may forward the instructions to one of the execution units, which are responsible for executing the instructions. Execution units 302A and 302B may perform similar functions, and each manage a different set of containers in which a user's computer-executable instructions are executed.

Execution unit 304A may comprise invoker 306, which may bring up new containers 208A-208N to execute instruction snippets in response to events occurring. Invoker may orchestrate and schedule instruction-snippets to particular containers. Invoker 306 may proactively bring up a new container 202A-202N before an event occurs, where the corresponding instruction snippet has a low acceptable latency. Invoker 306 may vary the number of containers 208A-208N brought up depending on several factors, which may include a number of users who have registered for low activation latencies, a current load of user snippets running, a frequency of events occurring, and projections for both the duration of currently-executing snippets and an expected rate of events occurring.

Containers 208A-208N may be specialized for a particular type of action. In such a scenario, invoker 306 may bring up a container 208A-208N whenever a new instruction snippet is submitted to the serverless platform and then executed. A container 208A-208N may be reused for executing the same code snippet again after a corresponding event occurs. When the types of events that occur vary, there may be a situation where some containers are sitting idle, without any load. In this scenario, invoker 306 may periodically recycle unused containers 208A-208N with different instruction snippets, or launch a new container 208A-208N in anticipation of future events occurring. Invoker 306 may implement a prioritization algorithm for executing instruction snippets in accordance with their respective acceptable latency.

Registrator 310 may take an indication of an event that corresponds to a particular instruction snippet, and register that event. The event is registered so that, when it occurs, controller 202 or one of its subparts is notified that the event has occurred, so that the corresponding instruction snippet may be executed in a user container 202A-202N.

Figure 4:
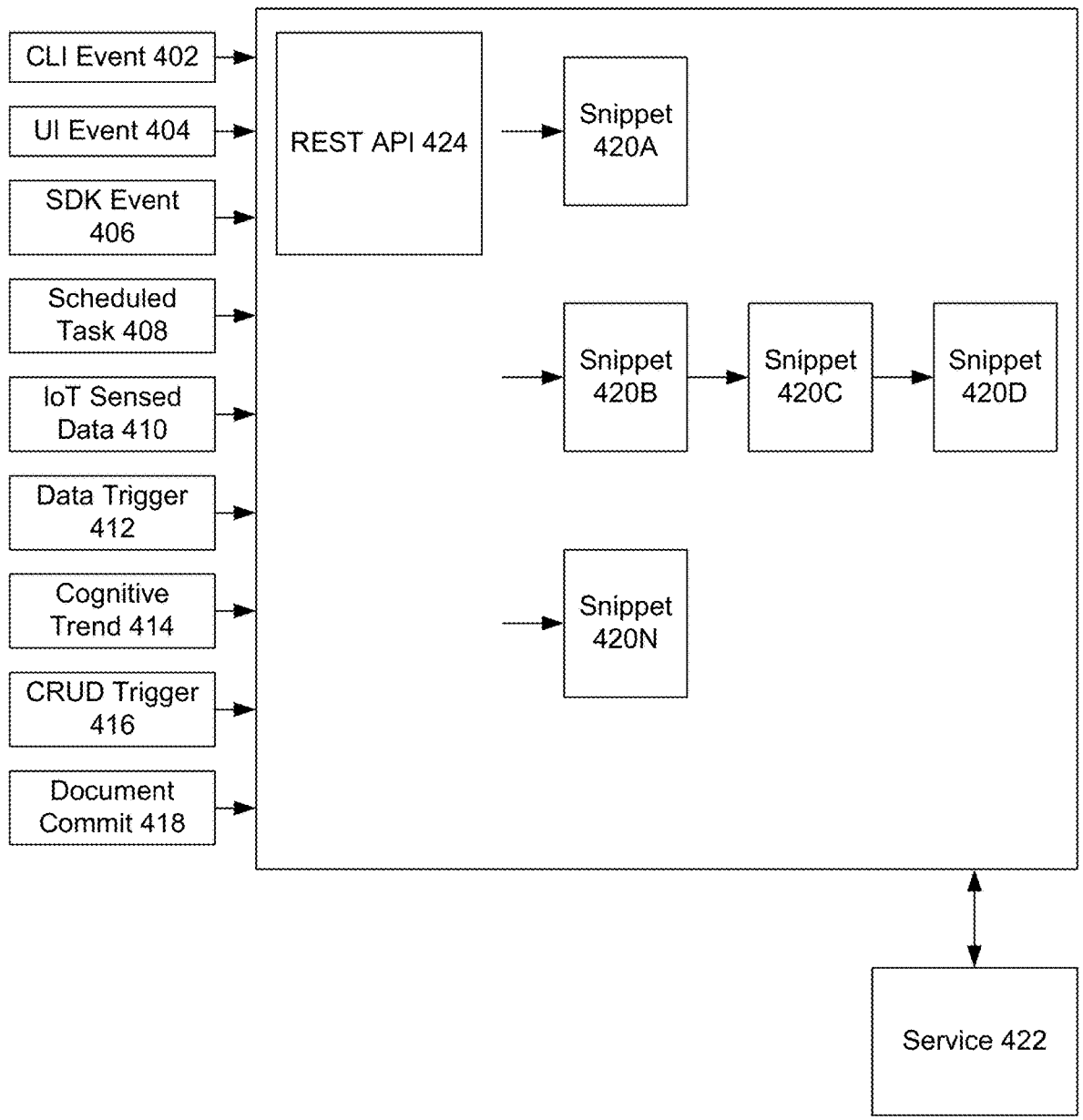
FIG. 4 illustrates more examples of a system architecture according to embodiments of the present disclosure.

FIG. 4 illustrates more examples of a system architecture according to embodiments of the present disclosure. In some embodiments, the system architecture of FIG. 4 may be implemented on the system architecture of FIG. 2 to implement a serverless computing platform with tiered latency. For example, events 402-414 may be processed by controller 202 of FIG. 2, and the occurrence of those events may cause some portion of snippets 420A-420N to be executed by one or more of user containers 202A-202N.

A variety of external events may occur and be detected, which may prompt the execution of an instruction snippet 420A-420N. Such an external event may be a CLI event 402 (command line interface), in which particular input is received at a CLI, such as through a user typing at a keyboard. Such an external event may be a UI event 404 (user interface event), in which particular input is received at a UI, such as through a touch-sensitive keyboard or a mouse. Such an external event may be a SDK event 406 (software development kit), where an application has been developed to trigger the occurrence of an event in certain circumstances.

Where the external event is one of these external events 402-406, they may be received and processed via a REST API 424 (Representational State Transfer Application Programming Interface). For example, a HTTP (HyperText Transfer Protocol) request may be received at a REST API endpoint that is created for those particular instructions.

In other examples, the external event may be a scheduled task 408, Internet of Things (IoT) sensed data 410, a data trigger 412, a cognitive trend 414, a CRUD trigger 416 (Create, Read, Update, and Delete operation on a database), or a document committed to a document repository 418. There may be other external events whose occurrence results in an instruction snippet being executed.

In response to one of these events occurring, some portion of instruction snippets 426 may be executed. As depicted, there is snippet 420A, and snippet 420N, which stand alone in execution. Then there are separate snippets 420B, 420C, and 420D, which are chained together so that they are executed in that order in response to an event occurring. In some embodiments, each of snippets 420B, 420C, and 420D may be executed in a separate user container 208A-208N.

In some embodiments, these snippets, and in particular these chained snippets may be written in a different programming language. For example, it may be that snippet 420A is written in a JavaScript programming language, and then chained snippets 420B-420D, are each written in a JavaScript, Python, and Swift programming language, respectively.

The execution of one or more of snippets 420A-420N may result in invoking service 422. In some embodiments, service 422 may be a service ecosystem, a third-party service, or a self-enabled service.

Figure 5:
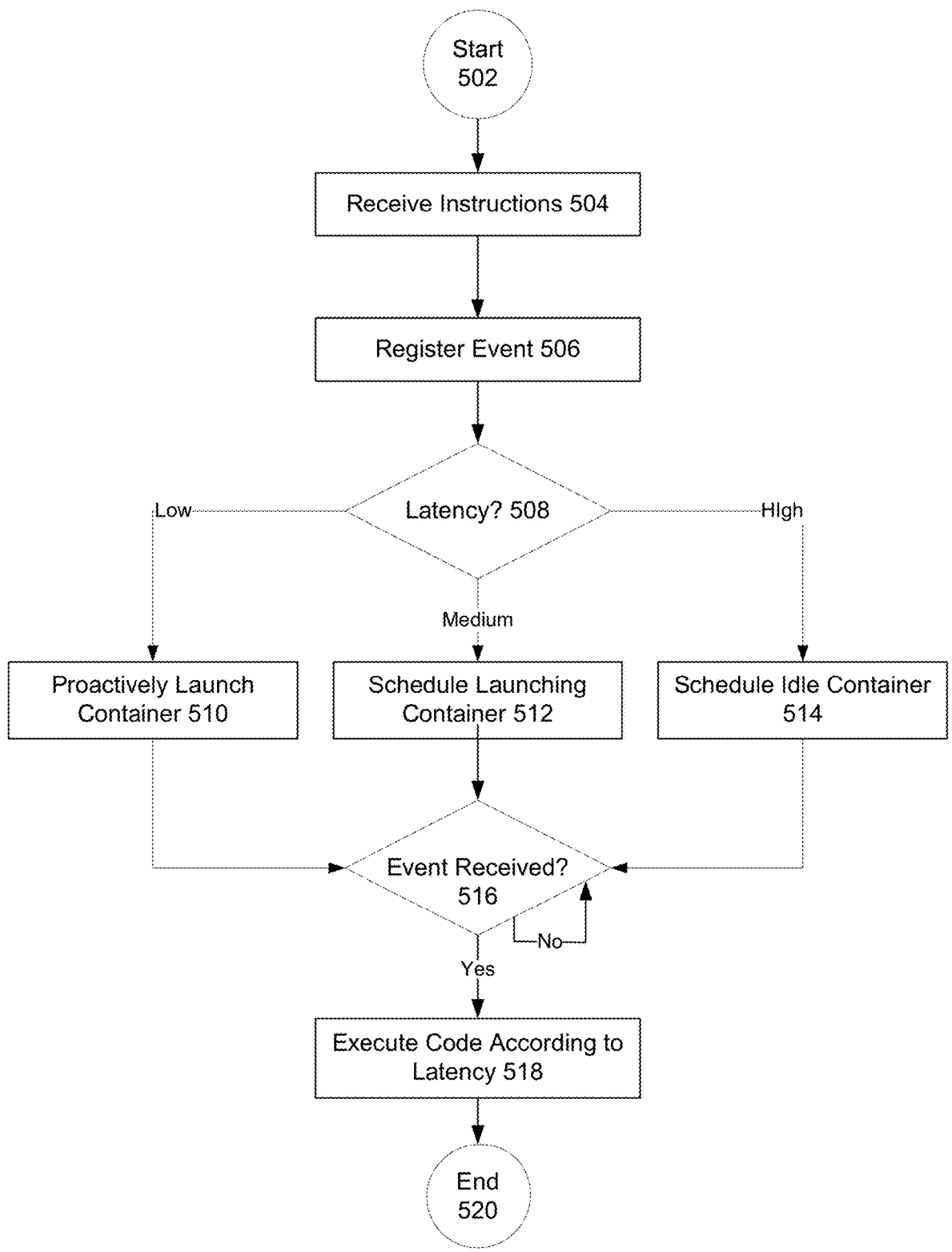
FIG. 5 illustrates example operating procedures for event-based serverless computing with tiered latency.

FIG. 5 illustrates example operating procedures for event-based serverless computing with tiered latency. Implementing the operating procedures of FIG. 5 may be used for prioritizing computer-executable instruction execution in a serverless computing platform. In some embodiments, the operating procedures of FIG. 5 may be implemented by controller 202 of FIG. 2. It may be appreciated that the operating procedures of FIG. 5 (and FIGS. 6-8) are illustrative and there may be embodiments that implement more or fewer operations than are depicted. For example, there may be a logical branch out of operation 508 where the latency is "very high" and a corresponding operation between operations 508 and 514 for handling the case where the latency is very high.

It may also be appreciated that there may be embodiments that implement the operations of FIG. 5 (and FIGS. 6-8) in a different order than is depicted. And additionally, it may be appreciated that there may be embodiments that implement the operations of multiple of FIGS. 5-8 in concert. For example, the operations of FIG. 5 may be implemented to effectuate event-based serverless computing with tiered latency, in conjunction with implementing the operations of FIG. 8 to effectuate billing associated with event-based serverless computing with tiered latency.

The operating procedures of FIG. 5 begin with operation 502 and then move to operation 504. Operation 504 depicts receiving computer-executable instructions. These computer-executable instructions may be received across a communications network from another computer and be associated with a particular user or user account. For example, a developer may write the instructions at his place of business and then upload them to a serverless computing platform that implements the operating procedures of FIG. 5. After operation 504, the operating procedures of FIG. 5 move to operation 506.

Operation 506 depicts registering an event associated with the computer-executable instructions received in operation 504. For example, in addition to uploading instructions as in operation 502, a user may also upload an indication of a particular event whose occurrence triggers the execution of those instructions.

In some embodiments, this may comprise registering the event so that the serverless computing platform is notified when the event occurs. That is, in some embodiments, operation 506 comprises indicating to a computer system that receives events to indicate when the event occurs. In some embodiments, operation 506 may comprise receiving an indication of an event, the computer-executable instructions to be executed in response to an occurrence of the event. After operation 506, the operating procedures of FIG. 5 move to operation 508.

Operation 508 depicts determining a latency associated with the computer-executable instructions received in operation 504. In the example of a user uploading a set of instructions and an indication of an event in operations 504-506, here the user may also upload an indication of an acceptable latency to the serverless computing platform. In some embodiments, operation 508 may comprise receiving an indication of an acceptable latency between a time at which the event occurs and a time at which computer-executable instructions are to be executed in response to the event occurring.

As described above, the three-level latency scenario (Low, Medium, High) described is illustrative, and there may be implementations of a serverless computing platform with tiered latency that use a different number of different amounts of latency. Where in operation 508 it is determined that the latency is Low, the operating procedures of FIG. 5 move to operation 510. Instead, where in operation 508 it is determined that the latency is Medium, the operating procedures of FIG. 5 move to operation 512. And instead, where in operation 508 it is determined that the latency is High, the operating procedures of FIG. 5 move to operation 516.

Operation 510 is reached from operation 508 where it is determined that the latency is Low. Operation 510 depicts proactively launching a container. Where the acceptable latency is small, it may be that waiting until a corresponding event occurs to launch a container in which to execute the instructions takes too long. In such a scenario, a container may be proactively launched—at the time of determining the acceptable latency for the instructions (in operation 510) or shortly thereafter. And while proactively launching a container may consume processing resources of the serverless computing platform between the time the container is launched and the corresponding instructions are executed, there may be an increased charge to the user associated with doing this (as later described with respect to the operating procedures of FIG. 8).

In some embodiments, operation 510 may comprise, in response to determining that the acceptable latency is below a first threshold amount of time, launching a container in which to execute the computer-executable instructions before the event occurs. After operation 510, the operating procedures of FIG. 5 move to operation 516.

Operation 512 is reached from operation 508 where it is determined that the latency is Medium. Operation 512 depicts scheduling the launch of a container. This may be seen in contrast to the Low latency scenario of operation 510. Here, a container is scheduled to be launched at some point in the future. This future scheduling may increase the likelihood that a triggering event for corresponding instructions occurs before the container is launched. And if that happens, there is a higher latency until the instructions are executed, relative to proactively launching the container in the Low latency scenario. So, where there is a charge associated with the acceptable latency (as described below with respect to FIG. 8), it may be that there is a smaller charge for scheduling a launch of a container for Medium latency instructions as opposed to proactively launching a container for Low latency instructions.

In some embodiments, operation 512 may comprise, in response to determining that the acceptable latency is above the first threshold amount of time and below a second threshold amount of time, scheduling a launch of the container for a future time. After operation 512, the operating procedures of FIG. 5 move to operation 516.

Operation 514 is reached from operation 508 where it is determined that the latency is High. Operation 514 depicts scheduling an idle container. This may comprise identifying a container in which to execute the instructions, and scheduling it to execute the instructions when it becomes idle or when there are sufficient computing resources available on the serverless computing platform. This may be a currently active container, or a container that is to be created to execute these instructions. It is likely that, implementing the execution of the instructions will result in a higher latency in executing the instructions relative to the Medium latency scenario of operation 512 or the Low latency scenario of operation 510.

In some embodiments, operation 514 may comprise, in response to determining that the acceptable latency is above the second threshold amount of time, scheduling an idle container in which to execute the computer-executable instructions. After operation 514, the operating procedures of FIG. 5 move to operation 516.

Operation 516 is reached from operations 510, 512 and 514, and from operation 516 itself when the result of the determination is No. Operation 516 depicts determining whether an event has been received. As depicted, operation 516 may loop on itself until an event has been received—specifically an event whose occurrence triggers the execution of the computer-executable instructions of operation 504.

In some embodiments, operation 516 may comprise receiving an indication that the event has occurred. Where in operation 516 it is determined that an event has been received, the operating procedures of FIG. 5 move to operation 518. Instead, where in operation 516 it is determined that an event has not been received, the operating procedures of FIG. 5 loop on operation 516 until an event has been received.

Operation 518 is reached from operation 516 where in operation 516 it is determined that an event has been received. Operation 518 depicts executing the computer-executable instructions according to the latency. Where the instructions are associated with Low latency, this may comprise executing them in a proactively launched container, as described with respect to operation 510. Where the instructions are associated with Medium latency, this may comprise executing them with a container whose launch was scheduled, as described with respect to operation 512. And where the instructions are associated with High latency, this may comprise executing them with a scheduled idle container, as described with respect to operation 514.

In some embodiments, operation 518 comprises, in response to receiving the indication that the event has occurred, executing the computer-executable instructions in accordance with the acceptable latency. After operation 518, the operating procedures of FIG. 5 move to operation 520, where the operating procedures of FIG. 5 end.

Figure 6:
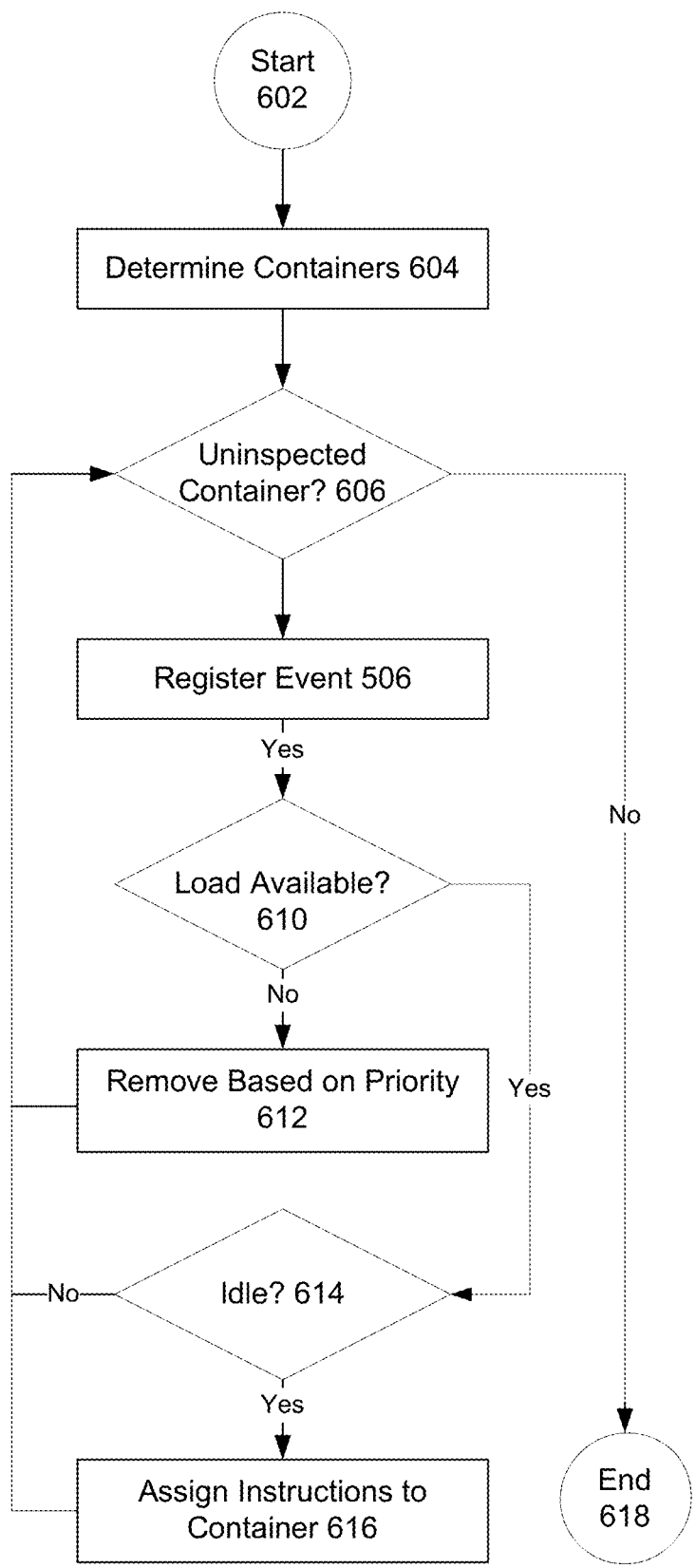
FIG. 6 illustrates example operating procedures for controlling system load in event-based serverless computing with tiered latency.

FIG. 6 illustrates example operating procedures for controlling system load in event-based serverless computing with tiered latency. In some embodiments, the operating procedures of FIG. 6 may be implemented by controller 202 of FIG. 2. As discussed with regard to FIG. 5, it may be appreciated that the operating procedures of FIG. 6 are illustrative and there may be embodiments that implement more or fewer operations than are depicted. It may also be appreciated that there may be embodiments that implement the operations of FIG. 6 in a different order than is depicted. And additionally, it may be appreciated that there may be embodiments that implement the operations of FIG. 6 in concert with one or more of the operations of FIGS. 5 and 7-8.

The operating procedures of FIG. 6 begin with operation 602 and move to operation 604. Operation 604 depicts determining what containers are present. This may comprise enumerating the containers present on the serverless computing platform, or on a subset of the serverless computing platform, such as those containers being managed by execution unit 304A of FIG. 3. After operation 604, the operating procedures of FIG. 6 move to operation 606.

Operation 606 depicts determining whether there is an uninspected container of the containers identified in operation 604. For example, there may be a list of containers maintained, and the operating procedures of FIG. 6 may involve traversing that list and inspecting each container in turn, with these operating procedures then looping back on operation 606. Then, when each container has been inspected, and appropriate actions taken based on the inspections, the operating procedures of FIG. 6 may end.

Where it is determined that there is an uninspected container, the operating procedures of FIG. 6 move to operation 608. Instead, where it is determined that there are no more uninspected containers, the operating procedures of FIG. 6 move to operation 618, where the operating procedures of FIG. 6 end.

Operation 608 depicts selecting a container from the uninspected container(s). Carrying on with the list-of-containers example described with respect to operation 606, this may comprise selecting the first container remaining in the list. After operation 608, the operating procedures of FIG. 6 move to operation 610.

Operation 610 depicts determining whether there is load available on the serverless computing platform that executes the containers. This may comprise measuring a combined load of physical computing servers that comprise the serverless computing platform, or of a subset of those servers. Where in operation 610 it is determined that there is no load available, the operating procedures of FIG. 6 move to operation 612. Instead, where in operation 610 it is determined that there is load available, the operating procedures of FIG. 6 move to operation 614.

Operation 612 is reached from operation 610 where in operation 610 it is determined that there is no load available. Operation 612 depicts removing a container based on its priority. This priority may correspond with acceptable latency of the instructions to be executed within the container, and the container with the lowest priority (which allows for the highest latency, and to be distinguished from Low latency, which allows for the least latency) may be removed from execution. In some embodiments, a container may be removed, or have its execution suspended or terminated, in operation 608 while other containers are to be inspected. In other embodiments, determining which specific container to remove and removing it may be performed after all of the containers to be inspected have been inspected.

In other embodiments, operations may be performed here in lieu of removing the container. For example, the snippet currently in the container may be replaced with a snippet that has a lower acceptable latency.

In some embodiments, operation 612 may comprise, in response to determining that an execution load of a system in which the container executes is above a load threshold, pausing or halting execution of a second container of the system. Operation 612 may also comprise determining to pause or halt execution of the second container in response to determining that a priority of the second container is less than a priority of the container. After operation 612, the operating procedures of FIG. 6 return to operation 606.

Operation 614 is reached from operation 610 where it is determined that there is load available. Operation 614 depicts determining whether the container selected in operation 608 is idle. This may comprise determining whether or not the user's computer-executable instructions are actively being executed, in contrast to whether there is other processing done with the container—for example with system processes instead of the user instructions.

Where in operation 614 it is determined that the container is idle, the operating procedures of FIG. 6 move to operation 616. Instead, where in operation 614 it is determined that the container is not idle, the operating procedures of FIG. 6 return to operation 606.

Operation 616 is reached from operation 614 where it is determined in operation 614 that the container is idle. Operation 616 depicts assigning computer-executable instructions to the container. This may comprise selecting an instruction set that is waiting to be executed from a plurality of sets of instruction snippets based on that instruction set having the lowest acceptable latency of the sets of snippets.

In some embodiments, operation 616 comprises, in response to determining that a load of the computer system is below a threshold, and in response to determining that a second container is idle, assign second computer-executable instructions to the second container, the second computer-executable instructions being associated with a second event, the second computer-executable instructions to be executed in response to an occurrence of the event. After operation 616, the operating procedures of FIG. 6 return to operation 606, where they loop through inspecting another container, until all containers have been inspected.

Figure 7:
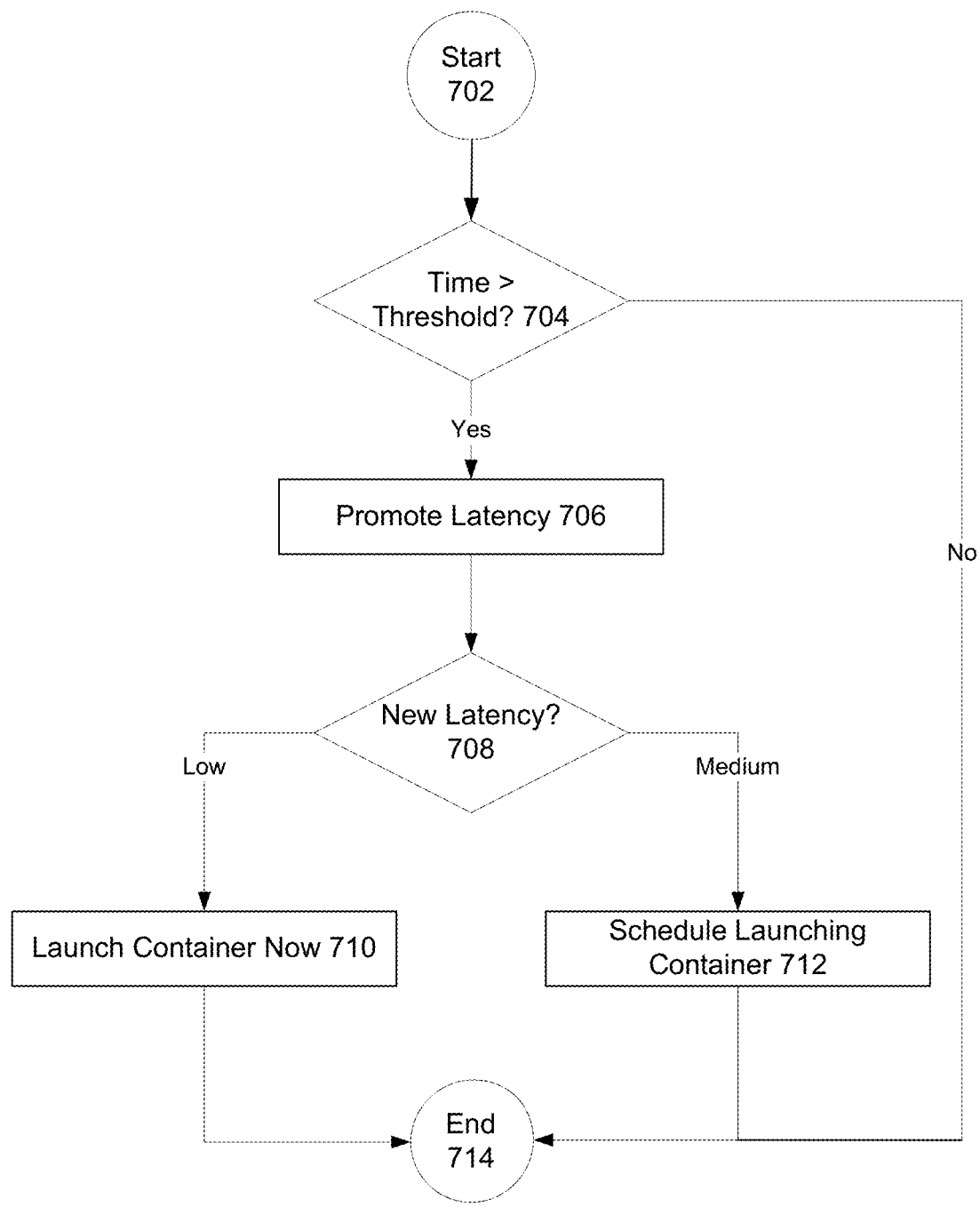
FIG. 7 illustrates example operating procedures for adjusting permissible latency associated with computer-executable instructions in event-based serverless computing with tiered latency.

FIG. 7 illustrates example operating procedures for adjusting permissible latency associated with computer-executable instructions in event-based serverless computing with tiered latency. In some embodiments, the operating procedures of FIG. 7 may be implemented by controller 202 of FIG. 2. As discussed with regard to FIG. 5, it may be appreciated that the operating procedures of FIG. 7 are illustrative and there may be embodiments that implement more or fewer operations than are depicted. It may also be appreciated that there may be embodiments that implement the operations of FIG. 7 in a different order than is depicted. And additionally, it may be appreciated that there may be embodiments that implement the operations of FIG. 7 in concert with one or more of the operations of FIGS. 5-6 and 8.

The operating procedures of FIG. 7 begin with operation 702 and then move to operation 704. Operation 704 depicts determining whether the time that has passed since an event has occurred is above a threshold amount of time. For example, with an instruction snippet that has High acceptable latency, it may be acceptable for up to a week to pass before the snippet is executed. But when that one-week threshold is passed, different action may be taken. In this scenario, the threshold amount of time may be that period of one week since the corresponding event occurred.

Where in operation 704 it is determined that the time that has passed since an event has occurred is above a threshold amount of time, the operating procedures of FIG. 7 move to operation 706. Instead, where in operation 704 it is determined that the time that has passed since an event has occurred is not above a threshold amount of time, the operating procedures of FIG. 7 move to operation 714, where the operating procedures of FIG. 7 end.

Operation 706 is reached from operation 704 where in operation 704 it is determined that the time that has passed since an event has occurred is above a threshold amount of time. Operation 706 depicts promoting the latency. Using the three-tiered latency example described above (where acceptable latency may be Low, Medium, or High), this may comprise promoting the latency from High to Medium, or from Medium to Low.

In some embodiments, operation 706 comprises, in response to determining that a time since the indication that the event has occurred has been received is above the acceptable latency and that the computer-executable instructions have yet to be executed in response to receiving the indication that the event has occurred, decreasing a value for the acceptable latency. After operation 706, the operating procedures of FIG. 7 move to operation 708.

Operation 708 depicts identifying the new latency. This may comprise, for example, determining whether the new latency is Low or if whether it is Medium. Where in operation 708 it is determined that the new latency is Low, the operating procedures of FIG. 7 move to operation 710. Instead, where in operation 708 it is determined that the new latency is Medium, the operating procedures of FIG. 7 move to operation 712.

Operation 710 is reached from operation 708 where in operation 708 it is determined that the new latency is Low. Operation 710 depicts launching a container now. This operation may be performed in a similar manner as operation 510 of FIG. 5, where a code snippet is originally assigned a Low acceptable latency.

In some embodiments, operation 710 comprises launching the container in which to execute the computer-executable instructions in response to decreasing the value for the acceptable latency. After operation 710, the operating procedures of FIG. 7 move to operation 714 where the operating procedures of FIG. 7 end.

Operation 712 is reached from operation 708 where in operation 708 it is determined that the new latency is Medium. Operation 712 depicts scheduling launching a container. This operation may be performed in a similar manner as operation 512 of FIG. 5, where a code snippet is originally assigned a Medium acceptable latency.

In some embodiments, operation 712 comprises launching the container in which to execute the computer-executable instructions in response to decreasing the value for the acceptable latency. After operation 712, the operating procedures of FIG. 7 move to operation 714 where the operating procedures of FIG. 7 end.

Figure 8:
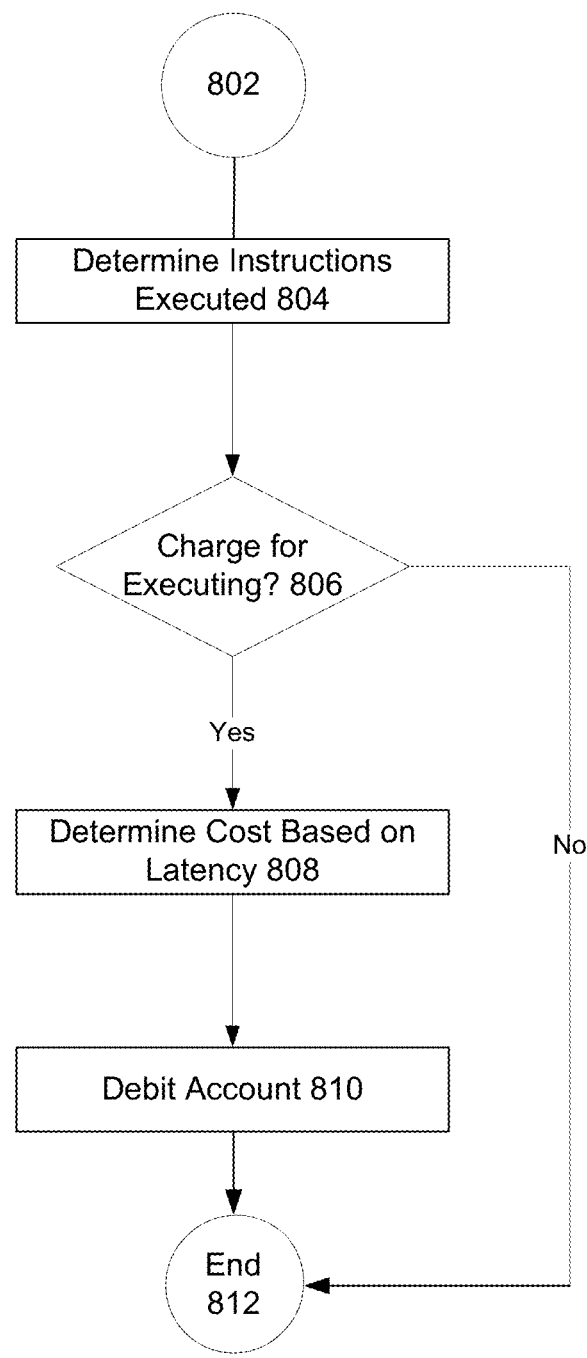
FIG. 8 illustrates example operating procedures for variable pricing in event-based serverless computing with tiered latency.

FIG. 8 illustrates example operating procedures for variable pricing in event-based serverless computing with tiered latency. In some embodiments, the operating procedures of FIG. 8 may be implemented by controller 202 of FIG. 2. As discussed with regard to FIG. 5, it may be appreciated that the operating procedures of FIG. 8 are illustrative and there may be embodiments that implement more or fewer operations than are depicted. It may also be appreciated that there may be embodiments that implement the operations of FIG. 8 in a different order than is depicted. And additionally, it may be appreciated that there may be embodiments that implement the operations of FIG. 8 in concert with one or more of the operations of FIGS. 5-7.

The cost model for having computer-executable instructions executed on a serverless platform may be a pay-as-you-go model, where a user is charged based on the time and/or computing resources spent executing those instructions. In some embodiments where acceptable latencies are used, a user may be charged based on the acceptable latency for a given set of instructions that are executed. This cost model may be seen in contrast to a model where a user is charged based on a virtual machine or other server used to execute the instructions, even when those devices sit relatively idle because the instructions are not currently being executed.

The operating procedures of FIG. 8 begin with operation 802 and then move to operation 804. Operation 804 depicts determining that computer-executable instructions have been executed. This may comprise, for example, controller 202 of FIG. 2 receiving an indication from the user container 208A-208N that executed the instructions that the instructions have been executed. After operation 804, the operating procedures of FIG. 8 move to operation 806.

Operation 806 depicts determining whether there is a charge for executing the instructions of operation 804. There may be embodiments of a serverless computing platform with tiered latency where there is no charge for executing instruction snippets, or where certain accounts (like administrator accounts) have no charge for executing their snippets. In some embodiments, determining whether there is a charge for executing the instructions comprises accessing a database that stores associations between user accounts and whether there is a charge for executing instructions for that user account, and looking up the user account that is associated with these instructions that have been executed.

Where in operation 806 it is determined that there is a charge for executing the instructions of operation 804, the operating procedures of FIG. 8 move to operation 808. Instead, where in operation 806 it is determined that there is not a charge for executing the instructions of operation 804, the operating procedures of FIG. 8 move to operation 812, where the operating procedures of FIG. 8 end.

Operation 808 is reached from operation 806 where in operation 806 it is determined that there is a charge for executing the instructions of operation 804. Operation 806 depicts determining the charge for executing the instructions of operation 804 based on their latency. For example, executing instructions that were originally assigned a Low acceptable latency may come with a higher charge than for executing instructions that were originally assigned a Medium acceptable latency (though that latency may have subsequently been promoted to low because too much time had passed since the triggering event, as described with respect to FIG. 7), which may come with a higher charge than for executing instructions that were originally assigned a High acceptable latency.

In some embodiments, operation 808 comprises, in response to executing the computer-executable instructions in accordance with the acceptable latency, determining a monetary charge for executing the computer-executable instructions based on the acceptable latency. After operation 808, the operating procedures of FIG. 8 move to operation 810.

Operation 810 depicts debiting a user account associated with the instructions of 804 by the amount determined in operation 808. In some embodiments, a database may be maintained that associates user accounts with a monetary amount owed by that user account to an operator of the serverless computing platform, or an account balance. In such embodiments, the charge for executing the present instructions may be added to the amount owed in the database, or subtracted from the account balance in the database.

In some embodiments, operation 810 comprises debiting the monetary charge from a user account associated with the computer-executable instructions. After operation 810, the operating procedures of FIG. 8 move to operation 812, where the operating procedures of FIG. 8 end.

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure, and these illustrations may comprise one or more operating procedures. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for prioritizing computer-executable instruction execution in a serverless computing platform, comprising:
    receiving computer-executable instructions;
    receiving an indication of an event, wherein:
        the computer-executable instructions are to be executed in response to an occurrence of the event, and
        the event represents an invocation of the computer-executable instructions;
    receiving an indication of an acceptable latency between a time at which the event occurs and a time at which computer-executable instructions are to be executed in the serverless computing platform in response to the event occurring, based on at least three tiers of acceptable latency including a first latency tier, a second latency tier lower than the first latency tier, and a third latency tier lower than the second latency tier;
    subsequent to receiving the indication of the event, performing at least one of:
        determining whether the computer-executable instructions, associated with the event, correspond to the first latency, wherein the acceptable latency is below a first threshold amount of time;
        determining whether the computer-executable instructions, associated with the event, correspond to the second latency, wherein the acceptable latency is above the first threshold amount of time and below a second threshold amount of time; or
        determining whether the computer-executable instructions, associated with the event correspond to the third latency, wherein the acceptable latency is above the second threshold amount of time;
    in response to receiving the indication that the event has occurred, dynamically determining whether the time has elapsed beyond the acceptable latency for the indicated latency tier;
    responsive to the elapsed time having passed beyond the acceptable latency for the indicated latency tier:
        dynamically initiating one or more adjustments to the acceptable latency;
        identifying a new latency tier for the computer-readable instructions; and
        promoting the first latency tier of the computer-executable instructions to either the second latency tier or the third latency tier;
    upon determining that the first latency tier has been promoted to the first third latency tier, launching a container in which to execute the computer-executable instructions before the event occurs;
    upon determining that the first latency tier has been promoted to the second latency tier, scheduling a launch of the container for a future time;
    upon determining the first latency tier has remained and has not been promoted, scheduling an idle container in which to execute the computer-executable instructions; and
    executing the computer-executable instructions in accordance with the acceptable latency in either the indicated latency tier or in the promoted latency tier.

2. The method of claim 1, further comprising:
    in response to executing the computer-executable instructions in accordance with the acceptable latency, determining a monetary charge for executing the computer-executable instructions based on the acceptable latency; and
    debiting the monetary charge from a user account associated with the computer-executable instructions.

3. The method of claim 1, further comprising:
    in response to determining that an execution load of a system in which the container executes is above a load threshold, halting execution of a second container of the system.

4. The method of claim 3, further comprising:
halting execution of the second container in response to determining that a priority of the second container is less than a priority of the container.

5. A computer system, comprising:
a processor, a computer-readable memory, a computer-readable tangible storage device, and program instructions stored on the storage device for execution by the processor via the memory, wherein the computer system is configured to:
receive computer-executable instructions;
receive an indication of an event, wherein:
the computer-executable instructions are to be executed in a serverless computing platform in response to an occurrence of the event, and
the event represents an invocation of the computer-executable instructions;
receive an indication of an acceptable latency in which to execute the computer-executable instructions, based on at least three tiers of acceptable latency including a first latency tier, a second latency tier lower than the first latency tier, and a third latency tier lower than the second latency tier;
subsequent to receiving the indication of the event, performing at least one of:
determine whether the computer-executable instructions, associated with the event, correspond to the first latency, wherein the acceptable latency is below a first threshold amount of time;
determine whether the computer-executable instructions, associated with the event, correspond to the second latency, wherein the acceptable latency is above the first threshold amount of time and below a second threshold amount of time; or
determine whether the computer-executable instructions, associated with the event correspond to the third latency, wherein the acceptable latency is above the second threshold amount of time;
in response to receiving an indication that the event has occurred, dynamically determine whether the time has elapsed beyond the acceptable latency for the indicated latency tier;
responsive to the time having passed beyond the acceptable latency for the indicated latency tier:
dynamically initiate one or more adjustments to the acceptable latency;
identify a new latency tier for the computer-readable instructions; and
promote the first latency tier of the computer-executable instructions to either the second latency tier or the third latency tier;
upon determining that the first latency tier has been promoted to the third latency tier, launch a container in which to execute the computer-executable instructions before the event occurs;
upon determining that the first latency tier has been promoted to the second latency tier, schedule a launch of the container for a future time;
upon determining the first latency tier has remained and has not been promoted, schedule an idle container in which to execute the computer-executable instructions; and
execute the computer-executable instructions in accordance with the acceptable latency in either the indicated latency tier or in the promoted latency tier.

6. The computer system of claim 5, wherein the computer system is further configured to:
in response to determining that the acceptable latency is above the first threshold amount of time and below a second threshold amount of time, schedule a launch of the container for a future time; and
in response to determining that the acceptable latency is above the second threshold amount of time, schedule an idle container in which to execute the computer-executable instructions.

7. The computer system of claim 5, wherein the computer system is further configured to:
in response to determining that a load of the computer system is below a threshold, and in response to determining that a second container is idle, assign second computer-executable instructions to the second container, wherein the second computer-executable instructions are associated with a second event and executed in response to an occurrence of the event.

8. The computer system of claim 5, wherein the computer system is further configured to:
in response to determining that: (i) a time since the indication that the event has occurred has been received is above the acceptable latency, and (ii) the computer-executable instructions have yet to be executed, decrease a value for the acceptable latency.

9. The computer system of claim 8, wherein the computer system is further configured to:
launch the container in which to execute the computer-executable instructions in response to decreasing the value for the acceptable latency.

10. The computer system of claim 8, wherein the computer system is further configured to:
schedule a launching of the container in which to execute the computer-executable instructions in response to decreasing the value for the acceptable latency.

11. The computer system of claim 5, wherein the computer system is further configured to:
in response to determining that a load of a system in which the container executes is above a load threshold, halt execution of a second container of the system.

12. The computer system of claim 11, wherein the computer system is further configured to:
halt execution of the second container in response to determining that a priority of the second container is less than a priority of the container.

13. A computer program product, comprising:
a non-transitory computer readable storage medium having programming instructions embodied therewith, the program instructions executable by a computer cause the computer to:
receive computer-executable instructions;
receive an indication of an event, wherein:
the computer-executable instructions are to be executed in a serverless computing platform in response to an occurrence of the event, and
the event represents an invocation of the computer-executable instructions;
receive an indication of an acceptable latency in which to execute the computer-executable instructions, based on at least three tiers of acceptable latency including a first latency tier, a second latency tier lower than the first latency tier, and a third latency tier lower than the second latency tier;
subsequent to receiving the indication of the event, performing at least one of:
determine whether the computer-executable instructions, associated with the event, correspond to the first latency, wherein the acceptable latency is
below a first threshold amount of time;
determine whether the computer-executable instructions, associated with the event, correspond to the
second latency, wherein the acceptable latency is
above the first threshold amount of time and below
a second threshold amount of time;
determine whether the computer-executable instructions, associated with the event correspond to the
third latency, wherein the acceptable latency is
above the second threshold amount of time;
in response to receiving an indication that the event has
occurred, dynamically determine whether the time
has elapsed beyond the acceptable latency for the
indicated latency tier;
responsive to the elapsed time having passed beyond
the acceptable latency for the indicated latency tier:
dynamically initiate one or more adjustments to the
acceptable latency;
identify a new latency tier for the computer-readable
instructions; and
promote the first latency tier of the computer-executable instructions to either the second latency tier
or the third latency tier;
upon determining that the first latency tier has been
promoted to the third latency tier, launch a container
in which to execute the computer-executable instructions before the event occurs;
upon determining that the first latency tier has been
promoted to the second latency tier, schedule a
launch of the container for a future time;
upon determining the first latency tier has remained and
has not been promoted, schedule an idle container in
which to execute the computer-executable instructions; and
execute the computer-executable instructions in accordance with the acceptable latency in either the indicated latency tier or in the promoted latency tier.

14. The computer program product of claim 13, wherein
the program instructions executable by the computer further
cause the computer to:
in response to determining that the acceptable latency is
above the first threshold amount of time and below a
second threshold amount of time, schedule a launch of
the container for a future time; and
in response to determining that the acceptable latency is
above the second threshold amount of time, schedule
an idle container in which to execute the computer-executable instructions.

15. The computer program product of claim 13, wherein
the program instructions executable by the computer further
cause the computer to:
indicate to a computer system that receives events to
indicate when the event occurs.

16. The computer program product of claim 13, wherein
the program instructions executable by the computer further
cause the computer to:
in response to executing the computer-executable instructions, determine a monetary charge for executing the
computer-executable instructions based on the acceptable latency; and
debit the monetary charge from a user account associated
with the computer-executable instructions.

17. The computer program product of claim 13, wherein
the program instructions executable by the computer further
cause the computer to:
in response to determining that a load of the computer
system is below a threshold, and in response to determining that a second container is idle, assign a second
computer-executable instructions to the second container, wherein the second computer-executable
instructions are associated with a second event and
executed in response to an occurrence of the event.

18. The computer program product of claim 13, wherein
the program instructions executable by the computer further
cause the computer to:
in response to determining that a time since the indication
that the event has occurred has been received is above
the acceptable latency and that the computer-executable instructions have yet to be executed in response to
receiving the indication that the event has occurred,
decreasing a value for the acceptable latency.

19. The computer program product of claim 18, wherein
the program instructions executable by the computer further
cause the computer to:
launch the container in which to execute the computer-executable instructions in response to decreasing the
value for the acceptable latency.

20. The computer program product of claim 18, wherein
the program instructions executable by the computer further
cause the computer to:
schedule a launching of the container in which to execute
the computer-executable instructions in response to
decreasing the value for the acceptable latency.

* * * * *